K. MICKLEY.
SHOCK ABSORBER.
APPLICATION FILED APR. 19, 1921.
1,421,977.
Patented July 4, 1922.
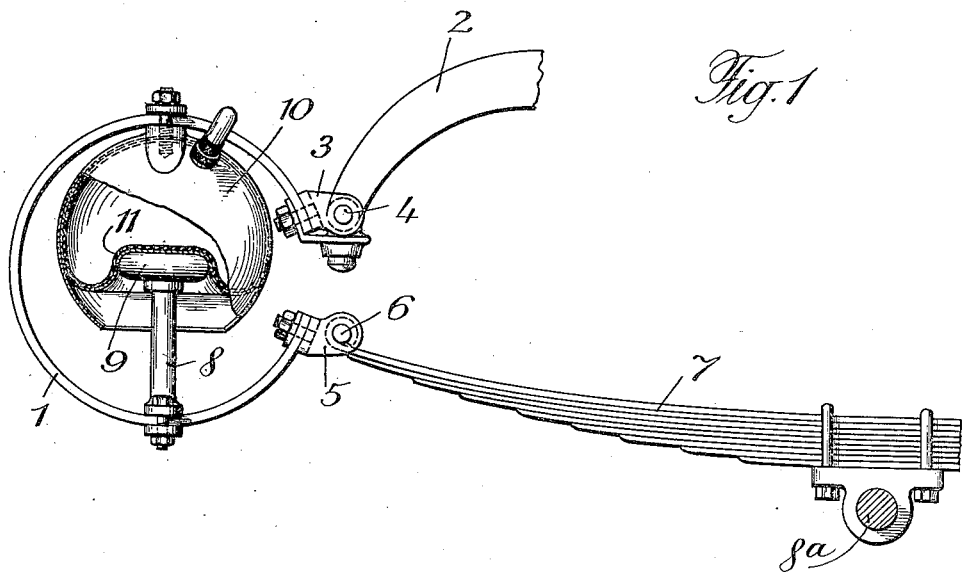
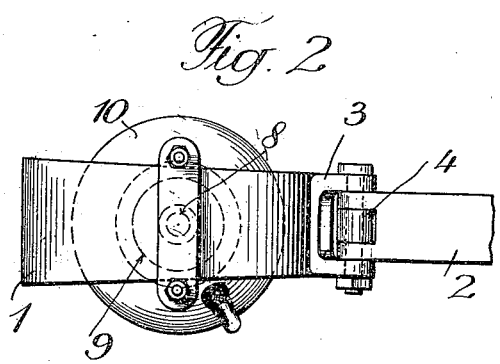
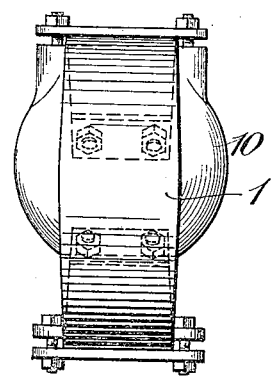
Inventor:
Karl Mickley.

UNITED STATES PATENT OFFICE.

KARL MICKLEY, OF ZURICH, SWITZERLAND, ASSIGNOR TO THE FIRM ALFRED JOËL & CO., OF ZURICH, SWITZERLAND.

SHOCK ABSORBER.

1,421,977.	Specification of Letters Patent.	Patented July 4, 1922.

Application filed April 19, 1921. Serial No. 462,651.

*To all whom it may concern:*

Be it known that I, KARL MICKLEY, a citizen of the Republic of Germany, residing at Zurich, Switzerland, have invented certain new and useful Improvements in Shock Absorbers; and I do hereby declare the following to be a clear, full, and exact description of the invention, such as will enable others skilled in the art to which it appertains to make and use the same, reference being had to the accompanying drawings, and to letters or figures of reference marked thereon, which form a part of this specification.

This invention relates to improvements in shock-absorbers. According to the invention a plate spring the flat side of which is curved to a hoop shape is interposed between members transmitting a load, and an air-cushion device being arranged inside the curved part of the said plate spring and operatively connected to the latter in the manner of a stay and assisting thus in transmitting the load from the one of said members to the other, whereby the plate spring acts as linkage to the parts of the air-cushion device when the latter perform a relative displacement against each other and acts also as levers for transmitting part of the load to said air-cushion device.

The absorbing of shocks is very efficiently effected by this combination.

One mode of carrying the invention into effect is shown on the accompanying drawings, in which:

Fig. 1 is an elevation,
Fig. 2 a plan view and
Fig. 3 an end view of the shock absorber fitted to a vehicle.

In this drawing 1 denotes the plate spring the flat side of which is bent for instance to form nearly a complete circle, the two ends of said plate spring 1 being comparatively a short distance apart. One of said ends is connected to the frame 2 of a vehicle by means of a bifurcated part or shackle 3 fixed to the plate spring 1 and adapted to swing around a fulcrum pin 4 mounted on the end of the frame 2. The other end of the plate spring 1 being in a like manner pivotally connected by means of a bifurcated part 5 to a pin 6 acting as fulcrum and fixed to the end of a laminated plate spring 7, which is connected in the usual manner to the axle 8ª of a vehicle. The curved plate spring 1 acts thus as resilient connection between the frame 2 and the ordinary laminated plate spring 7 and transmits the load of the car frame to said laminated spring 7. Further an air-cushion device is provided inside the curved part of the plate spring 1, the rod 8 of the piston 9 of said device being rigidly connected to one part of the plate spring 1 and the container 10 for the air-cushion 11 being rigidly connected to a part of the plate spring 1 diametrically opposite the part to which the piston rod 8 is fixed. The action of the air cushion device tends to press the two ends of the plate spring 1 further apart from each other and counteracts the compression of the plate spring 1 caused by the load. The air-cushion device effectively shortens the leverage of the forces generated by the load acting on the two ends of the plate spring 1 and assists in transmitting said load and stiffens the plate spring 1 in the manner of a stay. The plate spring 1 serves as transmission means for part of the load to the air-cushion device and forms the linkage for the piston and the air-cushion when a relative displacement between these two parts occurs. The stresses in the plate spring 1 are materially decreased by the action of the air-cushion device, and the pressure exerted by the air-cushion device tends to straighten the curved part of the plate spring situated at right angles to the axis of the air-cushion device. In this manner too great a deflection or deformation of the plate spring is avoided and the stresses resulting upon the work of deformation are thus materially decreased as mentioned above. The comparatively great width of the plate spring 1 adapts the latter to transmit and to take up stresses acting in the lateral direction occurring for instance when the vehicle travels around curves. To this end the width of the plate spring 1 increases from its open ends to the point diametrically opposite thereto, i. e. to the point where the greatest stresses occur. Any shocks occurring will be very effectively absorbed owing to the difference in the frequency of the oscillation of the laminated plate spring 7, of the plate spring 1 and of the air-cushion device 9, 10.

I claim:

1. In a shock-absorber, the combination of a plate spring curved to a hoop shape and interposed between two members for transmitting a load from one of said members to the other, and an air-cushion device operatively connected to said plate spring in the manner of a stay, at points lying between the ends of said plate spring and the part opposite said ends and tending to counteract the compression of said plate spring caused by the load.

2. In a shock-absorber, the combination of a plate spring curved to a hoop shape and interposed between two members for transmitting a load from one of said members to the other, and an air-cushion device arranged inside the curved plate spring in the manner of a stay operatively connected to the latter at points lying between the ends of said plate spring and the part opposite said ends and tending to counteract the compression of said plate spring caused by the load transmitted, the plate spring serving as linkage to the parts of the air-cushion device.

3. In a shock-absorber, the combination of a plate spring, curved to a hoop shape, one end of said plate spring being operatively connected to one member and the other end being operatively connected to a second member between which a transmission of load has to be effected, and an air-cushion device arranged in the manner of a stay inside said curved plate spring, the piston of said device being fixed to one part of the plate spring and the container for the air-cushion to a part diametrically opposite to the part where the piston is fixed, which air-cushion device tends to counteract the compression of said plate spring caused by the load and acts as stay for the plate spring, the latter acting as a linkage for the parts of the air-cushion device when a relative displacement between said parts occurs and as levers for transmitting part of the load to said air-cushion device.

4. In a shock-absorber for vehicles, the combination of a plate spring curved to a hoop shape, one end of said plate spring being operatively connected to the frame of a vehicle, and the other end being operatively connected to the ordinary spring members fixed to the axle of a vehicle, and an air-cushion device arranged in the manner of a stay inside said curved plate spring, the piston of said device being fixed to one part of the plate spring and the container for the air-cushion to a part diametrically opposite to the part where the piston is fixed which air-cushion device tends to counteract the compression of said plate spring caused by the load and acts as stay for the plate spring, the latter acting as linkage for the parts of the air-cushion device when a relative displacement between said parts occurs and as levers for transmitting part of the load to said air-cushion device.

In testimony that I claim the foregoing as my invention, I have signed my name.

KARL MICKLEY.